3,392,154
NOVEL MASTIC COMPOSITIONS AND PROCESS
OF PRODUCING SAME
Francis P. Baldwin, Summit, N.J., assignor to Esso
Research and Engineering Company, a corporation of Delaware
No Drawing. Filed July 29, 1964, Ser. No. 386,081
24 Claims. (Cl. 260—77.5)

ABSTRACT OF THE DISCLOSURE

A method of producing a saturated rubbery carboxy or hydroxy functional terminated $C_4$-$C_7$ polyisoolefin by reacting a low unsaturated polyisoolefin with ozone, treating the reaction product with a hydrogen-containing compound and subsequently treating the reaction product with a material selected from the group consisting of oxidizing agents and reducing agents. The carboxy or hydroxy materials may be reacted with polyfunctional agents such as organic polyisocyanates, aziridinyl compounds, polyepoxides, polybasic acids, etc., to produce mastics. Mastics are used in the automotive, construction and aircraft industries.

---

The present invention relates to novel mastic compositions and to a novel method of producing the same. Various relatively low molecular weight elastomeric compositions have been prepared in the past for use as sealants or caulking materials and are frequently of the self-curing type or are at least materials which can cure under ambient temperature and pressure conditions. The use of such materials in various industries, particularly the automotive, construction, and aircraft industries, has become widespread and the demand for a stable sealant of good ozone resistance and affording a permanent seal or coating constitutes a continuing object of search.

The hereinafter more fully described mastic compositions are materials which are derived from a special structural type of monoolefin-diolefin copolymer. Generally, these copolymers are obtained by the copolymerization of a major portion of a monoolefin such as an isoolefin having from 4 to 7 carbon atoms per molecule with a minor proportion of a conjugated diolefin where the second and third carbons of the conjugate system are both substituted only with hydrogen. The most commonly employed isoolefin is isobutylene although other monoolefins such as 3-methyl-1-butene or 4-methyl-1-pentene may also be used. Suitable conjugated diolefins which can be employed as the other component of the reacting mixture include: 1,3-butadiene, 2,4-hexadiene, and piperylene. The conjugated diolefins useful in this invention are those that, on copolymerization with, say, isobutylene, yield an olefin-elastomeric copolymer which, on ozonolysis, yields substantially no ketone compounds.

Generally, the feed composition contains between about 60 and 99.5 wt. percent of isoolefin with the remainder being the conjugated diolefin. The polymerization is generally carried out at a low temperature, e.g., between about $-50°$ and $-165°$ C. or lower in the presence of a Friedel-Crafts catalyst such as aluminum tribromide, aluminum trichloride, or the like with the reaction being carried out in a solvent medium such as a lower alkyl halide, for example, methyl chloride or ethyl chloride. U.S. Patent No. 2,356,128 fully describes the methods for the preparation of such isobutylene-diolefin copolymers, and is incorporated hereinto by reference. The final rubbery polymer generally has a viscosity average molecular weight of between about 100,000 and about 1,500,000 and its degree of unsaturation is characterized by a Wijs Iodine Number of between about 0.5 and about 50, usually between about 1 and about 20. Rubbers of lower molecular weight may be produced by increasing the amount of diolefin employed up to about 30% of the total feed and by carrying out the reaction under slightly higher temperaturesr than hereinbefore mentioned.

In the instant invention, which uses the herein described copolymer rubber as a starting material, it has been found that not all isoolefin-diolefin rubbery copolymers are suitable. For the instant novel process and to produce the instant novel mastic compositions, only those rubbers which are formed from isoolefins copolymerized with conjugated diolefins wherein the second and third carbons of the linear conjugate system are unsubstituted except for hydrogen yield final products which are suitable for the intended purpose. In other words, such materials as isoprene, (2-methyl-1,3-butadiene), myrcene, ocimene, 2,3-dimethyl-1,3-butadiene, and the like, are not suitable conjugated diolefins from which to make the rubbers or elastomers used as starting materials in the instant novel process.

In forming rubbers which may be successfully employed as starting materials according to the instant novel process, the conjugated diolefin reactant must be one corresponding to the following formula:

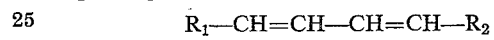

wherein $R_1$ and $R_2$ are the same or different substituents selected from the group consisting of hydrogen, a lower alkyl of from 1 to 8 carbon atoms such as methyl, ethyl, propyl, isopropyl, butyl, isobutyl, 2-methyl propyl, 2-ethyl propyl, etc., a phenyl radical or simple alkyl-substituted phenyl radical such as tolyl, xylyl, etc., and a $C_5$ to $C_8$ alicyclic or alkyl-substituted alicyclic radical such as cyclopentyl or cyclohexyl, methyl cyclopentyl, etc. Specific examples of such diolefins which may be used are butadiene, piperyline, 1,3-hexadiene and 2,4-hexadiene.

An example of a rubber formed in accordance with the above-described process using aluminum chloride as the catalyst and methyl chloride as the reaction solvent, was prepared using a 95% isobutylene-5% piperylene reaction mixture according to the U.S. patent reference hereinbefore cited. The final rubbery polymer had a viscosity average molecular weight of about 342,000 and a mol percent unsaturation of about 2.7. Still another typical rubbery polymer which is suitable for use in the instant invention was produced using a feed stock employing about 100 parts by weight of isobutylene and about 60 parts by weight of butadiene-1,3. These copolymers, as examples, contain unsaturation of the type II, as defined by C. E. Boord, "The Science of Petroleum," volume II, page 1349, Oxford University Press, New York (1938). Type II unsaturation is therein defined as having the structure

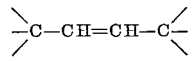

In order to achieve a satisfactory mastic elastomeric composition which will be curable at ambient temperature, it is necessary to use as the starting material an unsaturated rubbery copolymer containing the aforementioned type II unsaturation. This does not require that either the isoolefin or the conjugated diolefin reactants employed in producing the unsaturated rubbery copolymer must likewise contain type II unsaturation. In fact, neither reactant needs to contain such unsaturation, although the conjugated diolefin may contain it. In order to insure that type II unsaturation is present in the rubbery copolymer starting material for the novel process herein described and that the mastic product of that process will successfully cure at ambient temperatures, it is only necessary to employ a conjugated diolefin of the above defined structural formula as one of the reactants in forming the unsaturated rubbery copolymer material that is to be subjected to ozonization and subsequent treatments.

The rubbers of the type specified in accordance with the novel process are subjected to degradative ozonization through the use of a gas consisting wholly of ozone but more generally through the contacting of these specific rubbers with gases such as air or oxygen containing up to 15% of ozone. Mixtures of oxygen and ozone are preferred from a practical standpoint. The rubber formed from the conjugated diolefins herein defined as one of the reactants is dissolved in a suitable solvent such as carbon tetrachloride, the straight or branched chain aliphatic hydrocarbons such as normal hexane, normal heptane, isohexane, isopentane, or any other non-reactive solvent for the polymer which is inert to ozone under the conditions of this invention. Generally, for convenience, the concentration of the rubber in the solvent will range from about 1% to about 30% by volume, preferably between about 10% and about 20% by volume. Into this solution there is bubbled a stream of an ozone-containing gas while maintaining a temperature of between about −80' C. and about +85° C., preferably between about −50° C. and about 50° C., especially when the solvent is a hydrocarbon. Pressures of from atmospheric up to 500 p.s.i.g., preferably from atmospheric up to 100 p.s.i.g. may be employed, the higher pressure being used where the solvent would normally volatilize if temperatures in the upper range of those specified heretofore are employed. The time for carrying out the reaction may range from about 5 minutes to about 15 hours, generally, between about 15 minutes to about 2 hours is sufficient. British Patent No. 884,448 describes the ozonolysis of many polymers including natural rubbers and synthetic rubbers such as butyl rubber and, in general, the reaction conditions specified in that patent may be employed for carrying out the ozonization. It is, however, not contemplated in the instant process to carry out the ozonization in a solvent-free state but only in a solvent solution, emulsion, or dispersion. The temperature, pressure, and time of contact during the ozonization are correlated with one another so as to achieve, as far as possible, a rubber ozonide which, on ozonolysis, will yield a polymer having the desired molecular weight; preferably a polymer in which each molecule has attached at each chain end a functional group. In "Organic Chemistry" Third Edition, Fieser & Fieser (1956), page 69, the ozonides formed by ozonization of ethylenic unsaturation in olefin molecules are depicted as having a five-membered ring structure containing two carbon atoms and three oxygen atoms at the point where the ethylenic double bond originally was positioned prior to the ozonization. The primary decomposition of the ozonide of a type II olefin-containing polymer is believed to give rise to the formation of aldehyde functions or radicals at the chain ends. Aldehyde functions, being oxidation sensitive even to oxygen in the air, are sometimes subsequently oxidized up to carboxyl radicals.

The decomposition or ozonolysis of the ozonides prepared in accordance with the above-described process may be carried out in a number of ways. As illustrative of the manner in which this can be carried out, the ozonides, still in the solvent solution, may be subjected to small quantities of hydrogen, using a hydrogenation catalyst, or to an active hydrogen-containing compound such as water, tertiary amines such as pyridine and tributylamine, or to low molecular weight primary alcohols such as methanol, ethanol, etc. Additional methods for the ozonolysis are further described in a review article by P. S. Bailey, "Reactions of Ozone With Organic Compounds," published in "Chemical Reviews," volume 58, pages 925 to 1010 (1958).

The decomposition operation results in the formation of polymer chains having a lower molecular weight than those of the original polymer, i.e., those whose number average molecular weight will generally range between about 1,000 and about 30,000. This is frequently from about $\frac{1}{10}$ to about $\frac{1}{30}$ of the molecular weight of the starting material prior to ozonolysis but now, however, the product of ozonolysis exhibits a potential reactivity by reason of the presence of the aforementioned end group functions or radicals. There is at least one such terminal radical per molecule and in most cases one at each end of the newly formed chains.

It is preferred, although not necessary, to include in the reaction solution of the type II unsaturation-containing polymer an ozonide decomposer, such as, for example, pyridine, water, or methyl alcohol which serves to substantially simultaneously decompose the ozonide as it is formed. The presence of the decomposed ozonide having aldehyde end groups on the broken polymer chains are then capable of further oxidation to carboxyl groups due to the continued introduction of the oxygen and ozone-containing gas. Under these conditions, a higher concentration of terminal carboxyl groups per molecule can be obtained.

The new composition of lower molecular weight than of the original polymer and containing substantial amounts of aldehydic end groups can then be further oxidized by the use of conventional reagents such as air, oxygen enriched air, or oxygen, or by aqueous or non-aqueous solutions of oxidizing reagents, for example, peroxides such as hydrogen peroxide, sodium peroxide, solutions of hydrogen peroxide in aqueous sodium hydroxide or carbonate, peracids such as performic acid, peracetic acid, and perbenzoic acid, persulfates such as potassium persulfate, ceric salts such as ceric sulfate, potassium permanganate in mineral acid or alkaline solution, potassium ferricyanide, potassium dichromate, potassium bromate, and the like, such that the functional end groups are substantially all converted to carboxyl groups. Non-aqueous systems such as potassium permanganate in acetone also may be used. Alternatively, the functional end groups may be reduced to convert them to hydroxyl radicals. This may be done by catalytic hydrogenation, or by the use of chemical reducing agents, for example, complex metal hydrides such as sodium borohydride and lithium aluminum hydride, aluminum isopropoxide; metals such as zinc with mineral or acetic acid, trialkyl phosphites (triethyl phosphite, trioctyl phosphite), and the like. As a result, the starting polymer is converted to a degraded linear chain, low molecular weight compound having either hydroxyl end groups on each chain or carboxyl groups on each chain, or mixtures of the two types of radicals.

If the "end group" were a ketone group or function (not achieved however when using a type II olefin), it would not be susceptible to oxidation to a carboxyl function by the simple methods described herein. The reduction of a ketone end group would yield a secondary alcohol and, as is well known, the chemical reactivity of a hydroxyl hydrogen in a secondary alcohol is lower than that of the hydroxyl hydrogen in a primary alcohol. Reduction of the aldehydic end groups yield, of course, primary alcohol end groups. These considerations of chemical activity of active hydrogens at the ends of these degraded polymer chains are important for the ultimate use to which these products are to be put.

The product of ozonolysis (ozonide decomposition), followed by oxidation or reduction is now susceptible to crosslinking, oftentimes at ambient temperature, to a useful mastic material by the addition of polyfunctional reagents that can react with the active hydrogens as in any conventional or typical polyurethane production technology. For example, diisocyanate compounds such as toluene diisocyanate, hexamethylene diisocyanate, 4,4'-methylene bis(phenyl isocyanate); bis-chloroformate compounds such as tetramethylene-bis-chloroformate, and aziridinyl compounds, and polyamines, polyisocyanates, polyepoxides, polyaziridinyl compounds, polybasic acids and anhydrides of polybasic acids etc., are useful additions in producing the final cured mastic compositions. The resultant crosslinked products are found to be tough, rubbery, and particularly desirable in their field of use as cured mastic materials.

In order to illustrate the nature of the invention more fully but without intending to limit the invention thereby, the following examples are given:

EXAMPLE 1

A rubbery polymer prepared from a feed stock of 95% isobutylene and 5 wt. percent piperylene through the use of a methyl chloride solvent and an aluminum chloride catalyst, according to the process of U.S. Patent No. 2,356,128, showed a viscosity average molecular weight of about 342,000 and an unsaturation of about 2.7 mole percent. 144 grams of this polymer were dissolved in 1450 cc. of n-heptane as a solvent and 15 cc. of reagent grade pyridine was added. An oxygen stream containing about 18 mg. of ozone per liter of gas, measured at standard conditions of temperature and pressure, was bubbled into and below the surface of the solution held at about 2° to 5° C. at a sufficient rate (about 12.6 mg. ozone per minute) such that at the end of 5 hours about 3.78 grams of ozone had been introduced into the solution.

To about 1300 cc. of this ozonized polymer contained in solution under a nitrogen gas blanket, 100 cc. of water containing 6 grams of sodium borohydride were added. The resulting emulsion was heated to 50° C. and held at this temperature for 30 minutes. An additional 2 grams of sodium borohydride were then added and the reduction continued for an additional hour. It was carried out in this manner to insure, insofar as possible, that any aldehyde radicals present were converted into primary hydroxyl groups. Any carboxyl groups formed in the course of the ozonization and subsequent ozonolysis remain unaffected by the water-borohydride treatment.

The reactor contents were then cooled to room temperature and 33 cc. of concentrated hydrochloric acid and 67 cc. of water were added to the solution which was vigorously stirred for 30 minutes. 500 cc. of methanol were then added in order to aid the separation of the phases. The hydrocarbon layer was separated and dried over anhydrous sodium sulphate. Following filtration, the heptane was substantially removed from the polymer by evaporation and the product dried for about 16 hours at 65° C. under vacuum. The product had a number average molecular weight of about 2,780 (viscosity average molecular weight, 5,065) and contained about $4.8 \times 10^{-4}$ (0.00048) moles of carboxyl groups per gram, or about 1.33 carboxyl groups per polymer molecule.

Three 10-gram aliquots of the resultant dried polymer were admixed with 0.87, 0.96, and 1.04 grams, respectively, of toluene diisocyanate and the mixtures were placed in a desiccator during which time some thickening of the mixtures was noticed. The products were then removed from the desiccator and cured by heating in air at 100° C. for 16 hours. Satisfactory stable sealants were made in all three instances. These results show that a useful, curable mastic can be made from a type II olefin-containing rubbery copolymer.

EXAMPLE 2

A heptane solution containing 144 grams of the same rubbery copolymer as employed in Example 1 was ozonized as described in Example 1 except that ozone was introduced for 6½ hours instead of 5 hours for a total uptake of about 4.5 grams of ozone.

To 1200 cc. of the normal heptane solution of this ozonized product, 30 grams of aluminum isopropoxide dissolved in 60 cc. of isopropanol were added. The mixture was heated to about 85° C. under a distillation column with stirring and about 100 cc. of a distillate containing n-heptane, 54.5%; acetone, 1.2%; isopropyl alcohol, 44.2%; and impurity, 0.1% was collected and removed. The contents of the flask were then hydrolyzed with an excess of 10% sulfuric acid to free the hydroxyl groups from the aluminum salt. After isolation, the product had a number average molecular weight of about 3,410 and contained about 1.61 carboxyl radicals per polymer molecule. It contained about 0.43 mole of hydroxyl radicals per mole of polymer as judged by the acetone yield in the distillate from the reduction step. To 5 grams of this product 0.52 gram of toluene diisocyanate and 2 drops of triethylamine, as a catalyst, were added. The mixture was heated in a closed container for 3 hours at 158° F. to form an uncured prepolymer. At the completion of the reaction, about 5 cc. of benzene were added as thinner and 0.3 gram of a crosslinking reagent, 4,4'-methylene-bis(2-chloroaniline), were stirred into the uncured prepolymer product until a homogeneous mixture was obtained. The contents of the container were then poured into a mold of aluminum foil which was placed in a vacuum desiccator to allow the solvent to evaporate. After 1 hour, gelation had occurred and at the end of 24 hours nearly all of the benzene had evaporated and the mixture had become converted to a tough, translucent, cured, rubbery mastic. This vulcanizate was determined to be 93% insoluble in cyclohexane and the molecular weight between crosslinks was determined by the swelling capacity measurement in cyclohexane as described by P. J. Flory, "Principles of Polymer Chemistry," Chaper XIII, Section 3a, Cornell University Press, Ithaca, New York (1953). By this method, the molecular weight between the crosslinks was determined to be about 3,420 corresponding to the theoretical molecular weight assuming that the ozonized product, after ozonolysis, contained two functional end groups per molecule.

EXAMPLE 3

A similar procedure to that described in Example 2 was carried out except that instead of using a copolymer prepared from isobutylene and piperylene, a sample of commercial butyl rubber conventionally prepared from isoprene and isobutylene was employed. The compound prepared with toluene diisocyanate and 4,4'-methylene-bis(2-chloroaniline) had two drops of tributylamine added thereto but the final product failed to cure after standing for several days and also failed to cure after heating for several hours at 150° F. Thus it is evident that a type IV olefin containing copolymer does not yield a curable mastic by the process of this invention.

EXAMPLE 4

A starting rubbery copolymer was prepared in the same manner as those prepared in Examples 1 and 2 except that in the instant run the feed mixture constituted 62.5 wt. percent of isobutylene and 37.5 wt. percent 1,3-butadiene. On analysis it was determined that only about 3 wt. percent of the butadiene had been incorporated into the copolymer. The polymer obtained had a viscosity average molecular weight of about 432,000 and was about 2.93 mole percent unsaturated.

The ozonization was carried out as in the preceding examples for a period of 7 hours. Hydrolysis and reduction of the polymer with aluminum isopropoxide were carried out as in Example 2 and the reduced polymer had a viscosity average molecular weight of about 7,390. It contained about 1.22 moles of carboxyl radicals per mole of polymer and about 0.575 mole of hydroxyl radicals per mole of polymer. After removal of the solvent, 10 grams of the polymer were admixed with 0.853 gram of toluene diisocyanate, 2 drops of tributyl amine, 5 cc. of toluene as a diluent or thinner; the mixture allowed to react for about 3 hours at elevated temperature to form an uncured prepolymer and then about 0.56 gram of 4,4'-methylene-bis(2-chloroaniline) added. After thorough mixing, the mixture was poured into an aluminum dish. Gelling occurred in about an hour or slightly less and after about one day in the open atmosphere the cured product was dried for about 10 hours at about 105° C. under vacuum to remove the residual toluene. The cured mastic had a number average molecular weight between crosslinks of about 3,460 and was about 95% insoluble in cyclohexane. The product was fully cured and provided an excellent product for use as a mastic. This run shows the necessity of using a type II olefin in forming the rubbery copolymer starting material in order to obtain a satisfactory curable mastic.

EXAMPLE 5

A similar product was prepared to that described in Example 4 except that a conventional commercially available isobutylene-isoprene butyl rubber copolymer having a viscosity average molecular weight of about 450,000 and 1.7 mole percent unsaturation was employed. After ozonization, hydrolysis, and reduction in the manner of this invention, the number average molecular weight of the product was about 4,185 but the product had only about 0.97 mole of carboxyl radicals per mole of polymer and about 0.22 mole of secondary hydroxyl radicals per mole of polymer. An attempt was made to cure this material by admixing 10 grams of the product with 0.97 gram of toluene diisocyanate and 2 drops of tributyl amine, followed by placing the mixture in a sealed container and reacting it for 24 hours at 150° F. to form an uncured prepolymer. Thereafter the uncured prepolymer was cooled to room temperature and 0.63 gram of 4,4′-methylene-bis(2-chloroaniline) was added. No cure was effected at room temperature nor was any cure achieved upon heating the material to 150° F. for 24 hours. The deleterious effect of the presence of secondary hydroxyl containing "end groups" as compared with the primary hydroxyl containing end groups is made evident by the lack of cure. Additionally, it is difficult to approach the objective of two functional groups per polymer molecule by the process of this invention when the unsaturation in the chain is not of type II.

EXAMPLE 6

A copolymer of isobutylene with piperylene prepared in a similar manner to that described in Example 1 and having a viscosity average molecular weight of about 200,000 and an unsaturation of about 2.9 mole percent, in the amount of 150 grams, was ozonized in accordance with the procedure outlined in Example 1 for a period of 10 hours. However, the pyridine employed was introduced in stages; 5 cc. being introduced at the time of the start of the reaction, 5 cc. after 2 hours of ozonization, and 5 cc., after 4 hours of ozonization. The product, after freeing from solvent, had a number average molecular weight of about 1,940 and contained about $9.14 \times 10^{-4}$ moles COOH per gram. Thus, there were 1.77 carboxyl groups per polymer molecule. Two aliquots of this material were treated as follows:

(a) 5 grams of polymer were admixed with 0.6 gram of hexa[1-(2-methyl) aziridinyl] triphosphatriazine and the mixture cured for 2 hours at 200° F.

(b) The second aliquot of 5 grams was treated with 0.71 gram of the same triazine crosslinking agent and the mixture heated for 20 hours at 150° F.

In both cases a cured mastic product was obtained. According to the swelling measurements in cyclohexane, the number average molecular weight between crosslinks in the two cured products was about 7,600 and about 4,000 respectively.

A third aliquot of the product in the amount of 100 grams was dissolved in heptane to which was added 2.2 grams of potassium hydroxide (85%) dissolved in 100 cc. of water and 6 grams of sodium borohydride in 200 cc. of water. The emulsified mixture was stirred and heated to 50° C. and held at that temperature for 3 hours. It was then acidified with 42 cc. of concentrated hydrochloric acid in 160 cc. of water, after which the water layer was separated from the hydrocarbon layer which latter layer was washed three times with 400 cc. of water containing 40 grams of sodium sulfate. The so-treated hydrocarbon layer was dried with anhydrous sodium sulfate. After filtering the polymer solution from the sodium sulfate, the solvent was then evaporated off and the product dried in a vacuum oven. The dried product had a number average molecular weight of about 2,055 and contained about $7.45 \times 10^{-4}$ moles of COOH per gram of polymer.

A 5-gram sample of this reduced polymer was then compounded with 0.5 gram of hexa[1-(2-methyl)aziridinyl]triphosphatriazine and cured for 2 hours at 200° F. As determined by the swelling measurements in cyclohexane, the number average molecular weight between crosslinks of the cured mastic was about 15,000. Further 5-gram aliquots of the reduced polymer were cured as follows:

TABLE I

|  | A | B |
|---|---|---|
| Reduced polymer, grams | 5 | 5 |
| Toluene diisocyanate, gram | 0.67 | 0.85 |
| Tributyl amine, drop | 1 | 1 |
| Toluene, cc | 2.5 | 2.5 |

In each instance, the above mixtures were separately reacted for 24 hours or slightly longer at 150° F. to form the uncured prepolymer after which, in sample A, 0.43 gram of 4,4′-methylene-bis(2-chloroaniline) and, in sample B, 0.56 gram of this same crosslinking agent was admixed therewith and separately the two samples were then poured into molds and cured. Each of these samples cured in a matter of minutes at room temperature to a rubbery mastic product. Both samples were subsequently oven dried for about 16 hours at 75° C. and swelling capacity measurements in cyclohexane indicated that the number average molecular weights between crosslinks of samples A and B were respectively about 12,000 and about 1,300. Both materials proved to be excellent sealants and caulking materials.

EXAMPLE 7

A copolymer derived from isobutylene and piperylene was prepared substantially as described in Example 1. It had a viscosity average molecular weight of about 120,000 and an unsaturation of about 2.8 mole percent. A solution of this polymer was made up in n-hexane using 100 cc. hexane for each 10 grams of polymer. Aliquots of this were treated as follows:

An 830 cc. aliquot of the solution containing 75 grams of polymer was ozonized as previously described at about 2° C. to 5° C. until a stretched band made from natural rubber in the exit gas stream broke indicating that all the ozone being introduced into the reaction vessel was not being consumed. This occurred after about 3 hours of ozonization. The contents of the reactor were then heated to about 30° C. to 32° and ozone was continuously introduced for another 4.5 hours. The contents of the reaction vessel were then washed with 30 cc. of concentrated hydrochloric acid dissolved in 300 cc. of water and then were washed with distilled water. The hydrocarbon layer was separated, dried with anhydrous sodium sulfate, filtered, evaporated to dryness on a steam bath, and the polymer freed of all solvent by drying in a vacuum oven at about 100° C. The polymer A had a number average molecular weight of 1,787 and contained 0.000580 mole of carboxyl groups per gram of polymer. This amounted to about 1.03 carboxyl groups per polymer molecule.

A similar experiment was run as above in every detail except that before ozone was introduced into the reactor, 1 cc. of pyridine was added to the polymer solution. After 1 hour of ozonization another 1 cc. of pyridine was added and still a third amount of 1 cc. was added after 2 hours of ozonization. In this experiment, the stretched rubber band broke after about 3½ hours ozonization whereupon the reactor contents were heated to about 30° C. to 32° C. and ozonization continued for an additional 4 hours.

The washed and dried product B from this experiment had a number average molecular weight of 1800 and contained 0.000745 mole of carboxyl groups per gram of polymer or about 1.34 carboxyl groups per polymer molecule.

From a comparison of product A with product B as to the amount of carboxyl radicals contained therein per molecule, it is quite evident that the presence of pyridine in the reactive mixture during ozonization, although not essential, did materially aid in increasing the total amount or number of carboxyl groups in each polymer molecule eventually recovered.

Thus, by the process of this invention, copolymers containing type II unsaturated olefin structures in the chain backbone can be reacted with ozone and decomposed to yield low molecular weight saturated hydrocarbon chains containing primary OH groups at each end, carboxyl groups at each end, or a mixture of terminal OH and carboxyl groups, one at each end. The exact nature of the product will depend on the conditions of ozonization and subsequent treatments. Conversion to molecules containing carboxyl end groups is facilitated, for example, by post-treatment of the ozonide with conventional oxidizing agents such as alkaline ($Na_2CO_3$) hydrogen peroxide or peracids such as peracetic acid or performic acid, or nitric acid. Chains containing OH end groups may be produced by post-treatment with, for example, sodium dithionate, or by reducing with hydrogen catalytically, or with sodium borohydride, etc. Alternately they can be prepared by allowing random initial conversion to aldehyde and carboxyl end groups followed by more drastic catalytic reduction with hydrogen or by reduction with lithium aluminum hydride to yield terminal hydroxyl radicals on the polymer chain backbone.

Having now thus fully described and illustrated the character of the invention, what is desired to be secured by Letters Patent is:

1. A process for producing a mastic containing terminal primary hydroxyl or carboxyl radicals and which is capable of being cured with a polyfunctional reagent comprising:
   (a) ozonization of an unsaturated rubbery copolymer containing

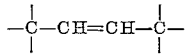

unsaturation and a molecular weight between 100,000 and 1,500,000 formed by copolymerizing from 60 to 99.5 weight percent of a $C_4$ to $C_7$ isoolefin and from 40 to 0.5 weight percent of a conjugated diolefin having the formula:

$$R_1-CH=CH-CH=CH-R_2$$

wherein $R_1$ and $R_2$ are selected from the group consisting of (i) hydrogen, (ii) $C_1$ to $C_8$ alkyl, (iii) phenyl, and (iv) $C_5$ to $C_8$ cycloalkyl by bubbling an ozone-containing gas into a solution of said copolymer in an ozone-inert solvent at a temperature of from $-80°$ C. to $+85°$ C. for a time of between $\frac{1}{12}$ and 15 hours;
   (b) treating the product of step a with an ozonide decomposer selected from the group consisting of hydrogen, a monomeric active-hydrogen containing compound, and tertiary amines to produce a polymer containing terminal aldehyde functionality; and
   (c) treating the product of step b with a material selected from the group consisting of (1) oxidizing agents to produce carboxy terminated polymers and (2) reducing agents to produce primary hydroxy terminated polymers, the product of step c having (a) a number average molecular weight of from 1,000 to 30,000, (b) a lower molecular weight than the unsaturated rubbery copolymer starting material, and (c) at least one terminally attached radical selected from the group consisting of primary hydroxyl and carboxyl.

2. The process of claim 1 wherein said reducing agent is an aqueous solution of sodium borohydride.
3. The process of claim 1 wherein step a is performed in the presence of said ozonide decomposer which is selected from the group consisting of a pyridine, water, and methyl alcohol, which decomposer is present in at least the stoichiometric amounts necessary to decompose ozonides formed at the double bonds of said rubbery copolymer.
4. A process as in claim 1 wherein the conjugated diolefin is piperylene.
5. A curable mastic compound produced according to the process of claim 4.
6. A process as in claim 1 wherein the conjugated diolefin is butadiene.
7. A curable mastic compound produced according to the process of claim 6.
8. The process of claim 1 wherein (a) the conjugated diolefin is piperylene and (b) the isoolefin is isobutylene.
9. A process according to claim 8 wherein pyridine is present during the course of said ozonization.
10. The product produced by the process of claim 9.
11. A process according to claim 8 wherein said terminally attached radical is carboxyl.
12. A process according to claim 8 wherein said radical is hydroxyl.
13. The process of claim 1 wherein (a) the conjugated diolefin is butadiene and (b) the isoolefin is isobutylene.
14. A process according to claim 13 wherein pyridine is present during the course of said ozonization.
15. The product produced by the process of claim 14.
16. A process according to claim 13 wherein said terminally attached oxygen-containing radical is carboxyl.
17. A process according to claim 13 wherein said oxygen-containing radical is hydroxyl.
18. The process of claim 1 wherein the product of step c is reacted with an organic diisocyanate to form a prepolymer which prepoylmer is then cured by further reaction with a compound selected from the group consisting of water, polyamines, and polyhydroxy containing compounds.
19. A composition produced according to the process of claim 1.
20. The composition of claim 19 wherein the mastic contains predominantly terminal carboxyl groups.
21. The composition of claim 19 wherein the mastic contains predominantly terminal hydroxyl groups.
22. The process of claim 1 wherein the product of step c is cured with an organic diisocyanate cross-linking agent.
23. A cured mastic compound produced according to the process of claim 22.
24. A process as in claim 22 wherein compound b is cured with an organic diisocyanate as a crosslinking agent.

References Cited

UNITED STATES PATENTS

| | | | |
|---|---|---|---|
| 2,356,128 | 8/1944 | Thomas et al. | 260—79 |
| 2,674,586 | 4/1954 | Welch | 260—31.8 |
| 2,901,458 | 8/1959 | Banes et al. | 260—88.1 |
| 3,002,959 | 10/1961 | Hicks | 260—88.1 |
| 3,036,045 | 5/1962 | Short et al. | 260—77.5 |
| 3,040,002 | 6/1962 | Aldridge | 260—77.5 |
| 3,234,197 | 2/1966 | Baum | 260—93.7 |

FOREIGN PATENTS

| | | |
|---|---|---|
| 636,565 | 3/1964 | Belgium. |
| 884,448 | 12/1961 | Great Britain. |

DONALD E. CZAJA, *Primary Examiner.*

F. McKELVEY, *Assistant Examiner.*